United States Patent [19]
Nimberger et al.

[11] Patent Number: 5,215,120
[45] Date of Patent: Jun. 1, 1993

[54] APPARATUS AND METHOD FOR REDUCING VALVE EMISSIONS

[75] Inventors: Spencer M. Nimberger, Houston; Robert L. Ward, Missouri City, both of Tex.

[73] Assignee: Precision General, Inc., Houston, Tex.

[21] Appl. No.: 795,056

[22] Filed: Nov. 20, 1991

[51] Int. Cl.$^5$ ............... F16K 1/44; F16K 15/8
[52] U.S. Cl. ............... 137/614; 137/614.19; 137/614.2; 137/614.21; 251/332; 251/158
[58] Field of Search ............... 137/614, 614.19, 614.2, 137/614.21; 251/332, 158

[56] References Cited
U.S. PATENT DOCUMENTS

| | | |
|---|---|---|
| 2,765,185 | 10/1956 | Mott . |
| 2,792,014 | 5/1957 | Granberg ............... 137/614 X |
| 3,060,978 | 10/1962 | Botkin . |
| 3,168,906 | 2/1965 | Brown ............... 137/614 X |
| 3,537,476 | 11/1970 | Evans ............... 137/614 |
| 4,061,157 | 12/1977 | Hanssen . |
| 4,078,578 | 3/1978 | Buchholz ............... 137/614 |
| 4,949,745 | 8/1990 | McKeon . |

OTHER PUBLICATIONS

Parker Fluid Conn; Quick Couplings Hydraulic; Nov. 1985; pp. 11-13; U.S.
Parker Fluid Conn; Instrumentation Quick Couplings; Jan. 1989; p. 1; U.S.

*Primary Examiner*—Arnold Rosenthal
*Attorney, Agent, or Firm*—Mark A. Oathout; John R. Kirk, Jr.

[57] ABSTRACT

The present invention is directed to a valve system which upon disconnection essentially eliminates the release of liquids and vapors to the atmosphere. The invention includes a precision machined poppet and valve seat such that the leading end of the poppet and the end of the valve housing are flush when the valve is closed and such that the sides of the poppet are flush with the surface of the valve seat. Fluids and vapors are eliminated as the valve closes. The valve is not sealed until after closing. The invention is normally used with two flushly abutting valves which close sequentially for the elimination of liquids and vapors.

10 Claims, 13 Drawing Sheets

APPARATUS AND METHOD FOR REDUCING VALVE EMISSIONS

BACKGROUND OF THE INVENTION

Valve systems are used to transmit pressurized fluids or liquids from one container to another container, especially when the pressurized liquids are corrosive, toxic or environmentally unsafe. With such systems, for example, a hose valve for transmitting the pressurized fluids is threadably connected to a filler valve of a container or tank so that a fluid passageway exists when the valves are open allowing liquids to freely pass. A second set of valves are normally connected allowing vapors to freely return to expedite the filling procedure. Prior to disengaging the valves, each valve must be closed off and the passageway between each valve sealed so that no liquid is emitted to the atmosphere when the joint between the valves is disconnected. Because of the toxicity, corrosiveness or otherwise environmental unsafeness and destructiveness of the cumulative effects of these liquids and vapors, even minute amounts are considered harmful and undesirable.

Prior to this invention, valves were closed in the following manner: the valve poppet had an O-ring fitted around the poppet. The valve was considered closed when the O-ring sealed and came to rest against the valve seat. However, the valve seat was not completely evacuated prior to sealing, because the poppet and valve seat were not designed for complete evacuation and the procedure used was the single step of simultaneous closing and sealing of valves.

Unfortunately, these prior valve systems allowed small quantities of liquids to become trapped within the passageway between the two valves because the compressible valve seals hit the inner walls of the valve bodies causing a seal before fluids were completely evacuated and a proper sequence was not followed for evacuating abutting valves. Minute amounts of fluid were thereby trapped within the sealing area which were later emitted when the valve joint was disconnected. Although the amount of fluid is minute, each time a valve is disconnected these minute amounts of toxic, corrosive or otherwise environmentally unsafe or destructive liquids are emitted to the atmosphere. Repeated engagement and disengagement of millions of hose and filler valves throughout the chemical and petrochemical industries can substantially add unwanted pollutants to our already endangered atmosphere.

SUMMARY OF THE INVENTION

The present invention relates to a substantially emissionless valve system and method for evacuating, closing and sealing valves within a valve system. The system can be piggy backed onto existing tanks to be filled. Each valve within the valve system of this invention comprises a valve housing and a valve stem having an independently moving slip fitted poppet. The slip fitted poppet is fitted within a recessed area of the valve stem head. The poppet and valve seat are machined so that all fluid is evacuated as the valve is closed. When in closed position, the poppet, made of precision machined metal, is flushly seated within the equally precision machined housing of the valve so that the flat surfaced leading end and the conical surface of the poppet are flush with the flat surfaced lower end and the conical surface of the valve housing. In one embodiment the trailing end of the poppet is also flush with the upper surface of the valve seat. A compressible valve seal or O-ring is compressed when an actuator thrusts the valve stem against the O-ring thereby completing the sealing arrangement.

The present invention is preferably used with two such valves. The flat surfaced ends of each valve housing are joined flushly together and the flat surfaced leading end of each of the valve poppets seat flushly with the ends of the valve housings. Thus when the valves are closed the ends of the valve housings and the leading ends of the valves are in intimate contact.

In the method of this invention the actuator of the valve actuates the axially moving valve stem. The poppet is slip fitted within a central bore in the valve stem head. The compressible valve seal is concentrically positioned between the end of the valve stem head and the poppet. As the valve stem is moved towards the fluid outlet of the valve, the valve stem head thrusts the compressible valve seal against the poppet moving the poppet until it fits flushly against the sloped inner walls of the valve seat. Once the poppet is seated within the valve seat, the continued action of the actuator on the valve stem head compresses the O-ring to form the seal. When the fluid passageway of the first valve is sealed, the valve stem of the second valve thrusts the compressible valve seal of the second valve against the second poppet thereby forcing the second poppet within the conical walls of the second valve seat. Once the precisionally machined second poppet is seated, the valve stem continues its forward thrust and compresses the compressible valve seal or O-ring of the second valve thereby forming the seal to substantially reduce or essentially eliminate fluid trapped between the first valve and the second valve. The first valve can then be disconnected from the second valve without corrosive, toxic or otherwise environmentally unsafe fluids, vapors or gases emitted into the atmosphere.

Another embodiment of the invention is directed to a vapor return valve connection. The principles for essentially eliminating trapped fluid and vapors in the vapor return connection are the same as for the fluid inlet connection except for the means of actuating the valves. In this embodiment an inner valve stem is actuatable relative to and independent of the first valve stem. When the first valve is open the inner valve stem can be thrusted against the second valve to force the second valve open thereby allowing vapor to flow through the valve system. When closing the valve system the first and second valves are closed sequentially and are not sealed until completely closed to essentially eliminate pockets of liquids or vapors between the valves as previously summarized.

DETAILED DESCRIPTION OF THE INVENTION

The valve system and process of the present invention provides ZERO BLEED sealing between a first valve and a second valve which upon closing of the valves essentially eliminates unwanted fluid emissions so that toxic, corrosive or otherwise environmentally unsafe fluids are prevented from leaking to the atmosphere when the valves are subsequently disengaged. The essentially emissionless property of the present invention results from valves having precision machined metal surfaces that fit flushly against each other prior to sealing thereby preventing minute amounts of fluids and vapors from being trapped within the valves, fluids and vapors that could potentially be emitted to the atmosphere when the valves are disengaged.

Figure 1:
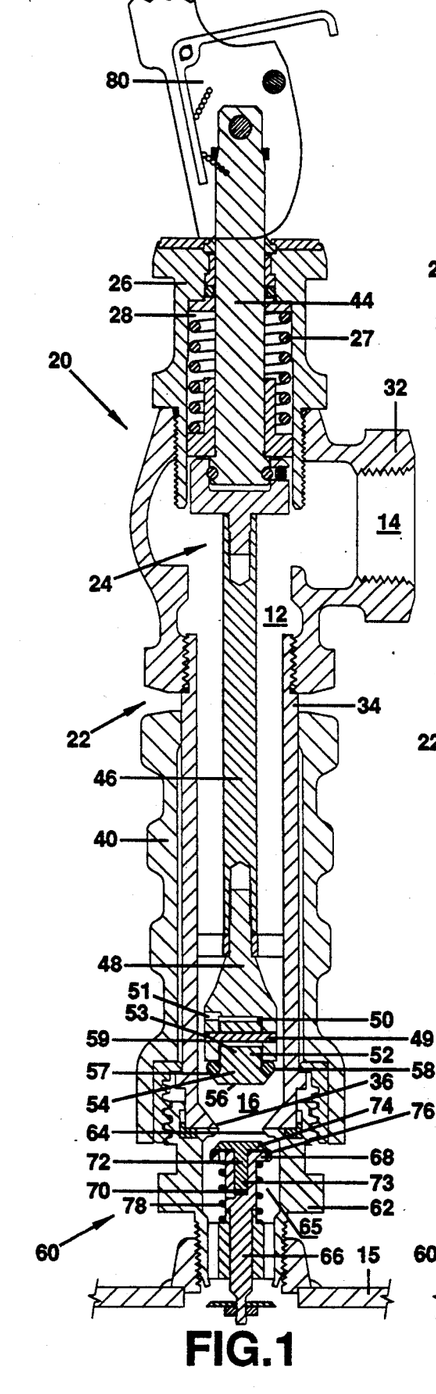
FIG. 1 shows the valve system in open position.
Figure 2:
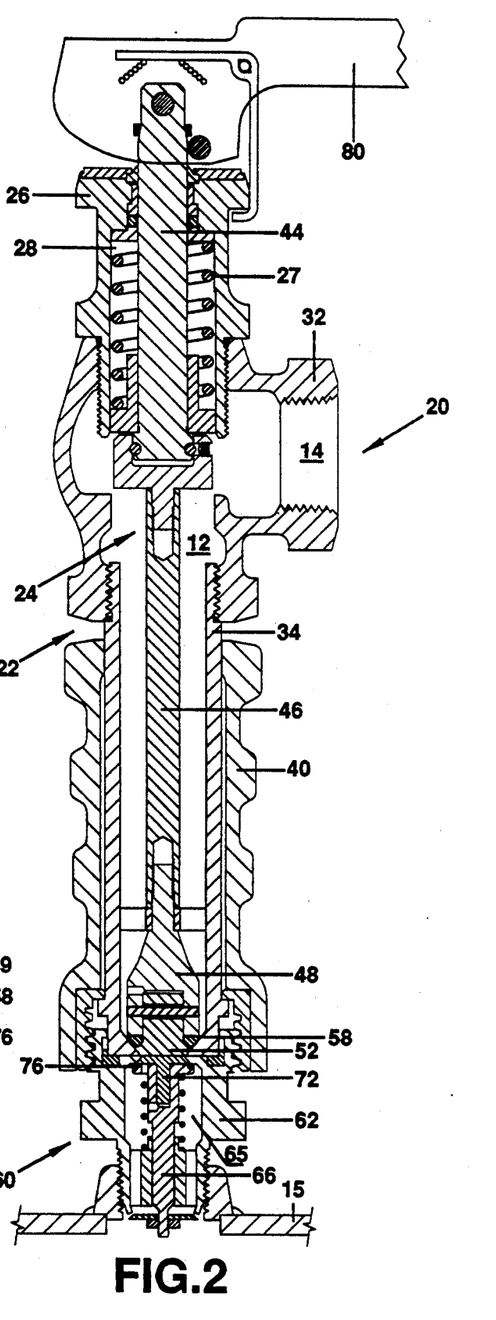
FIG. 2 shows the valve system in closed position.
Figure 3:
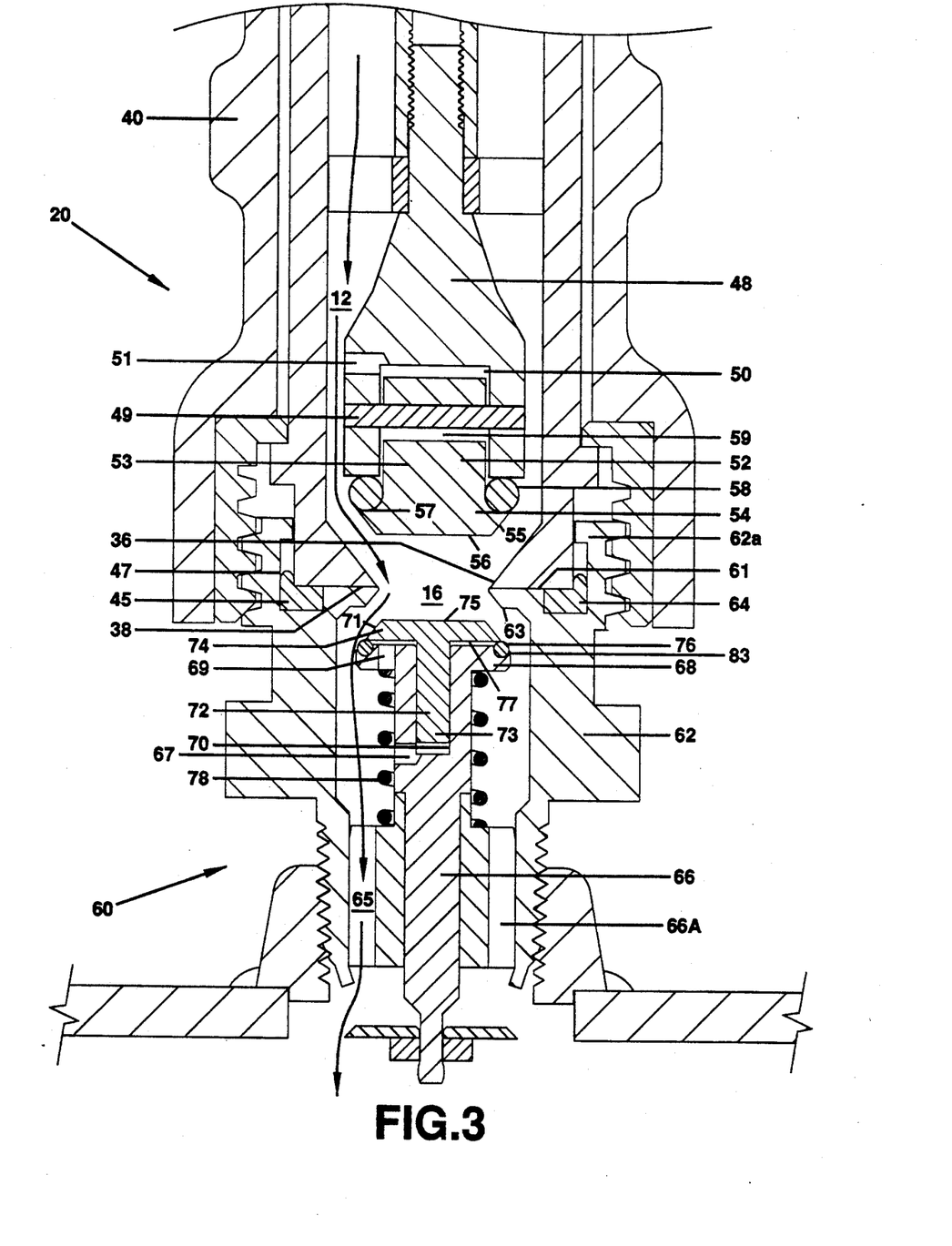
FIG. 3 is an enlarged view of the valve system in the open position which also demonstrates phase 1 of the method of the invention.

Referring now to FIGS. 1-3, a first valve (as shown a hose end, snap spring, globe valve) 20 is threadably connected to a second valve 60 (as shown a back check, filler valve) thereby forming a continuous fluid passageway 12, 65 between first valve 20 and the second valve 60. The first valve 20 includes a first valve housing 22, and a valve stem assembly 24 axially extending through the housing 22. As shown the valve housing 22 includes a bonnet 26 having a centrally positioned bore 28. Bonnet 26 is threadably connected to a valve body 32 which is connected to a sleeve 34. The lower end 38 of the sleeve 34 is flat or planar. A valve seat 36 having a conical surface is contained within the lower end. A speed nut 40 circumscribes sleeve 34. Speed nut 40 is a hand make-up piece allowing a quick connect and disconnect to be made between the first valve housing 22 and the second valve housing 62.

Valve housing 22 forms a fluid passageway 12 with a fluid inlet 14 and a fluid outlet 16 opposite the valve 60. This fluid passageway 12 is continuous with the fluid passageway 65 of the second valve 60 when the valve system is in the open position.

The valve stem assembly 24 is positioned within the fluid passageway 12. The valve stem assembly 24 includes actuator stem 44, a valve stem 46 ending in a valve stem head 48. The valve stem assembly extends axially through the fluid passageway 12 and is moveable with respect to the housing 22. The valve stem head 48 has a recessed bore 50. A first poppet 52 is slip fitted by any appropriate means within the recessed bore 50.

The poppet 52 has a neck 53 and head 54. Poppet head 54 has a conical surface 55, a leading end 56 and a trailing end 57. The trailing end 57 is preferably semicircular for the seating of a compressible seal 58. Opening 51 in valve stem head 48 allows drainage from behind poppet 52. Poppet 52 also includes a hole 59. A roll pin 49 through valve stem head 48 and through hole 59 retains poppet 52 while allowing bounded axial movement of poppet 52. The diameter of roll pin 49 with respect to the diameter of hole 59 must allow for sufficient movement of poppet 52 between a position where compressible seal 58 is not squeezed and a position where compressible seal 58 is squeezed for sealing.

The conical surface 55 of head 54 and valve seat 36 are machined to seat flushly together. Cone shaped head 54 and valve seat 36 are preferably precisionally machined to a surface finish of twenty to thirty-two RMS. However the geometry of the cone shaped head 54 and the valve seat 36 are more critical than the surface finish. Since both the head 54 and the valve seat 36 are conical and since the diameter of poppet head 54 from the leading end 56 to the trailing end 57 (which defines the conical surface 55) fits exactly the opening defined by valve seat 36 emissions are reduced to cavities created by chamfers on edges due to the machining of the pieces by a skilled machinist.

As poppet 52 moves away from valve stem head 48 a groove is formed between valve stem head 48 and cone shaped member 54 around poppet neck 53. A compressible valve seal 58 occupies this groove. Since poppet 52 is slipped fitted within recessed bore 50, actuation of valve stem assembly 24 will not directly impart motion to poppet 52. Instead, actuation of valve stem assembly 24 will impart motion to compressible seal 58 which in turn imparts motion to poppet 52.

The outer diameter of the compressible seal 58 is not greater than the diameter of an imaginary cone (defined by cone shaped head 54 or valve seat 36) at the height where the compressible seal is located on the imaginary cone. In other words the outer diameter of the compressible seal 58 is less than or equal to the diameter of the valve seat 36 at the height of the valve seat 36 where the compressible seal is positioned when the conical head 54 comes to rest in valve seat 36. Alternatively, the outer diameter of the compressible seal 58 is less than the inner diameter of the valve seat 36 at the height of the valve seat where the compressible seal 58 is positioned when conical head 54 comes to rest in valve seat 36.

When valve stem assembly 24 is actuated cone shaped head 54 will be thrusted flushly into valve seat 36 at which time poppet 52 will come to rest with metal to metal contact between the conical surfaces 36 and 55. The continued thrust on valve stem assembly 24 will cause valve stem head 48 to squeeze compressible seal 58 over the interface of poppet 52 and valve seat 36.

The second valve 60 includes a housing 62 having a flat or planar end 61. A valve seat 64 having a conical surface is contained at one end. A bore or fluid passageway 65 is in communication with the fluid passageway 12 of the first valve 20 when connected. A second valve stem assembly 66 is mounted on flow through spool 66a and axially located within the central bore 65 and axially moveable with respect to the second housing 62. Preferably the second valve stem assembly 66 ends in a second valve stem head 68. The second valve stem head 68 has a recessed bore 70. A poppet 72 is slip fitted within recessed bore 70.

The poppet 72 has a neck 73 and a head 74. Poppet head 74 has a conical surface 71, a leading end 75 and a trailing end 77. The height of the conical head 74 is equivalent to the height of the valve seat 64 such that both the leading end 75 and the trailing end 77 of the conical head 54 are flush with the end 61 of the housing and the top of the valve seat 63, respectively when closed. Openings 67 and 69 in the valve stem assembly 66 allow drainage from behind the poppet 72.

When the second valve 60 is in the closed position the conical head 74 seats flushly within the valve seat 64 of the second housing 62. Valve stem head 68 includes a groove 83 on its upper surface. A compressible seal 76 is placed in this groove. Poppet 72 will slip into recessed bore 70 until the trailing end 77 of conical head 74 comes to rest against the top of compressible seal 76. The height of conical head 74 matches the height of valve seat 64.

The conical surface 71 is machined to seat flushly within valve seat 64. Machining is preferably to a surface finish of twenty to thirty-two RMS. However, the geometry of the cone shaped head 74 and the valve seat 64 are more critical than the surface finish. Since both the head 74 and the valve seat 64 are conical and since the diameter of the poppet 72 from the leading end 75 to the trailing end 77 (which defines conical surface 71) fits exactly the opening defined by the valve seat 64 emissions are reduced to cavities created by chamfers on edges due to the machining of the pieces.

When valve 60 is open poppet 72 will be supported by compressible seal 76 contained in groove 83. Actuation of valve stem assembly 66 will impart motion to compressible seal 76 which in turn imparts motion to poppet 72. The middle diameter of the compressible seal 76 is preferably equal to the diameter of the conical head 74 at the trailing end 77. Thus, in this embodiment the outer diameter of the compressible seal 76 may exceed the outer diameter of the conical surface 71. However the compressible seal 76 will not be squeezed until the poppet 72 is seated in the valve seat 64 since the height of the seat 64 is equal to the height of the conical head 74.

Conical head 74 will come to rest with metal to metal contact in valve seat 64 prior to compressible seal 76 making contact with valve surface 63 over the interface of valve seat 64 and conical head 74. Continued thrusting on the valve stem 66 caused by spring 78 will then squeeze compressible seal over the interface between conical head 74 and valve surface 63.

The second valve 60 can be a "piggy back" valve that fits or adapts to an existing tank or container thereby allowing the valve system of this invention to be "piggy backed" onto existing tanks. The compressible seals 58, 76 as shown have a round cross section but could be square or any other suitable cross sectional shape.

The system can be arranged by flip flopping the two valve embodiments 20 and 60 or by using two of the same embodiment.

The method of this invention uses the valve system described above to close and seal valves so that unwanted emissions are reduced and substantially eliminated. The method comprises a series of steps for evacuating fluids, moving the valve into a closed position and sealing the valves. Although these steps take place almost simultaneously the sequence of the steps is critical to eliminating unwanted fluids prior to sealing.

When the valve connection is made the housing ends 38 and 61 must be flush. A guide flange 65 helps to guide the end of sleeve 34 as speed nut 40 is threaded. Compressible seal 45 preferably extends above the planar end 61 of valve 60 about 20/1,000 of an inch. This short extension creates a seal but prevents the compressible seal 45 from being pinched between the two valves as they are flushly connected. The compressible seal 45 preferably has a rectangular shaped cross section. The compressible seal 45 is contained within an annulus 47 in valve housing 62. A gap due to "pinching" of the compressible seal 45 cannot be created between the ends of the valve housings 22 and 62 during connection with speed nut 40 since the compressible seal 45 is contained within the annulus 47, the protrusion of the compressible seal 45 is limited to 20/1000 of an inch beyond the end of valve housing 62, and the insertion of valve housing 22 into valve housing 62 is precisely controlled by tolerances between the outer diameter of valve housing 22 and the inner diameter of valve housing lip 62a. When connection is made through speed nut 40 any excess volume of compressible seal 45 will be squeezed into the opening around the edge and outside of valve housing 22 within the annulus 47.

Referring to FIG. 3, phase 1 is an enlarged diagram of the valve system in open position so that fluids flow freely within the fluid passageway 12, 65. Second valve 60 is forced to the open position by the flow of the pressurized fluid entering at 14 and exiting to the receiving vessel. Although not shown in FIG. 3, the flow may force poppet 72 to squeeze compressible seal 76 against valve stem head 68.

Figure 4:
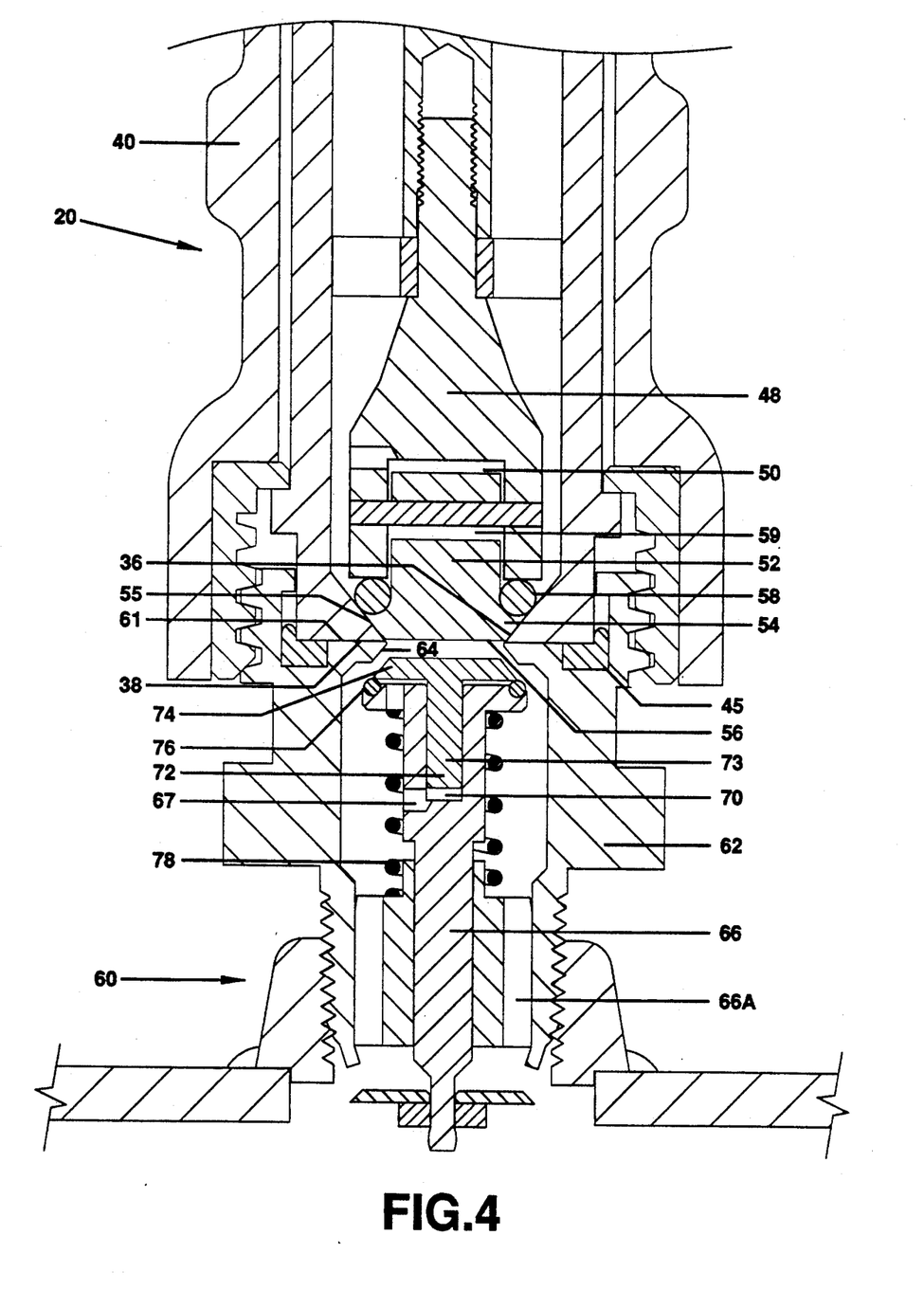
FIG. 4 is a diagram showing phase 2 of the method of the invention.
Figure 5:
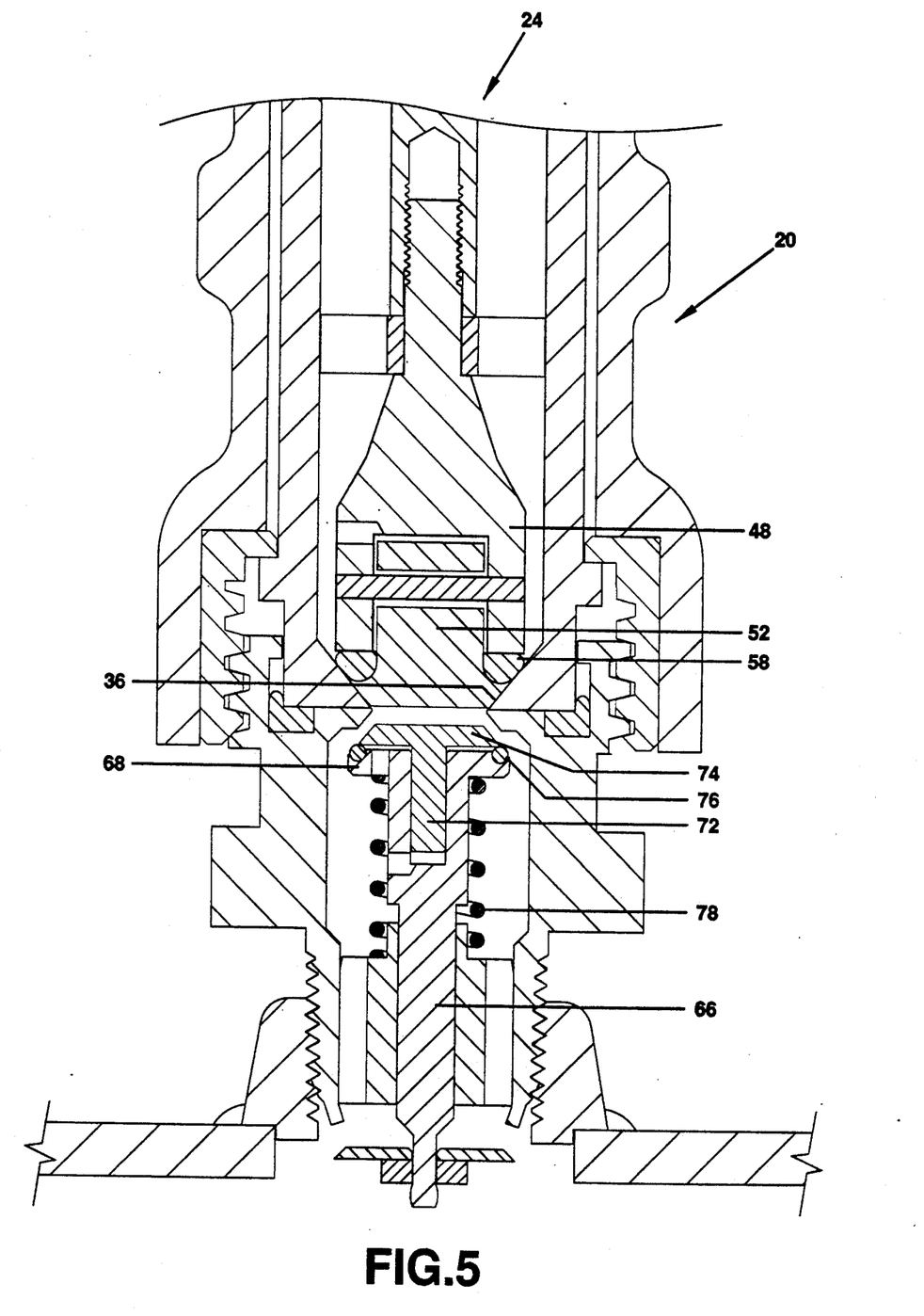
FIG. 5 demonstrates phase 3 of the method of the invention.

Once the valve stem assembly 24 of the first valve 20 is actuated towards the second valve 60 by an actuator 80 such as a snap acting handle, the poppet 52 of the first valve 20 is thrust via the compressible seal 58 towards the conical bore or valve seat 36 causing fluids to be evacuated from the valve seat 36. FIG. 4 shows the poppet 52 seated flushly in the valve seat 36 to close the valve. Because the poppet 52 and valve seat 36 are precision machined, substantially all fluids are evacuated as the poppet 52 comes to rest within the valve seat 36. In FIG. 5 as the valve stem assembly 24 continues toward the valve seat 36 the poppet 52 remains stationary and the valve stem head 48 compresses the compressible seal 58 or O-ring thereby forming the seal in the first valve 20.

Figure 6:
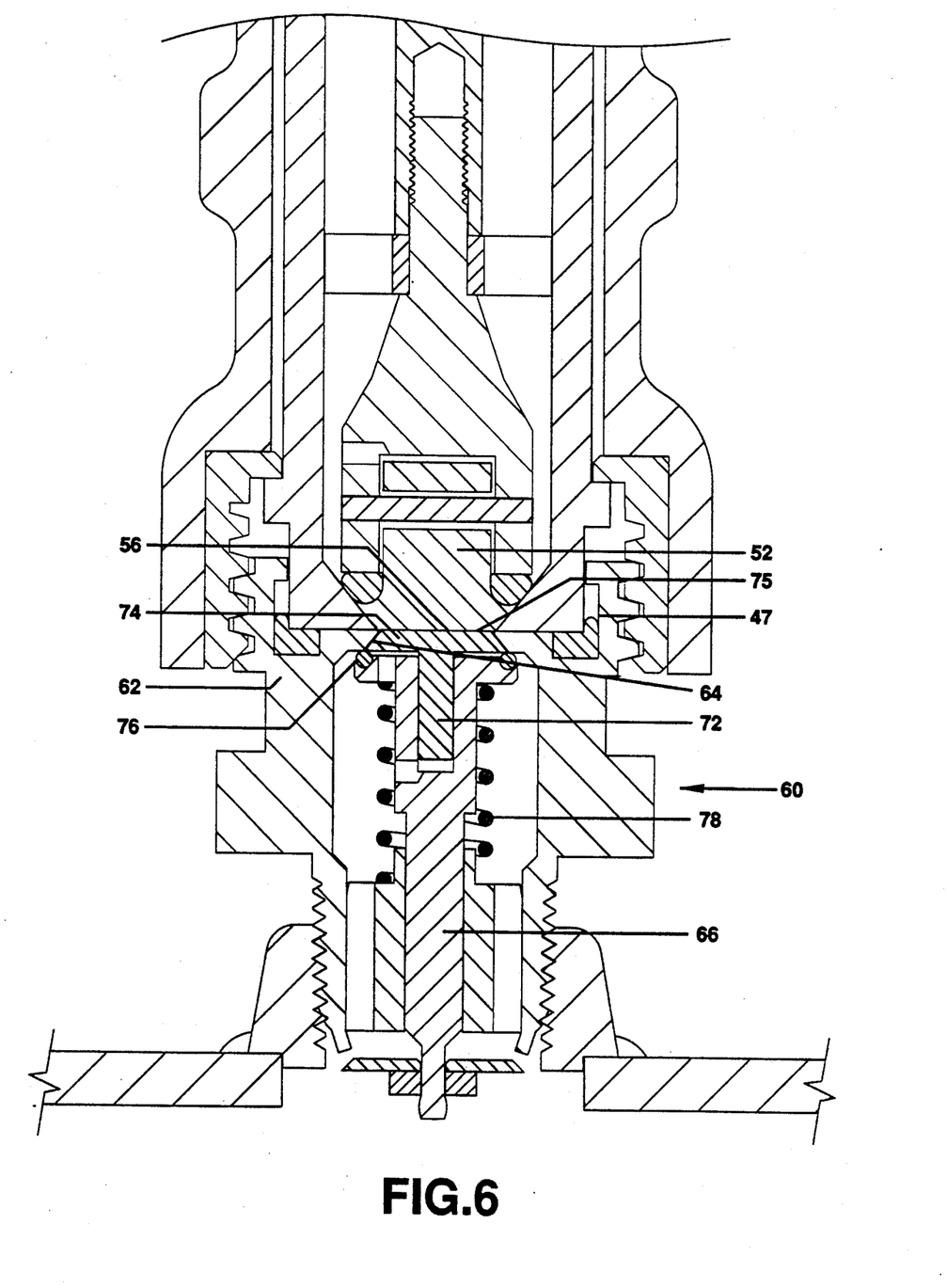
FIG. 6 represents phase 4 of the method of the invention.
Figure 7:
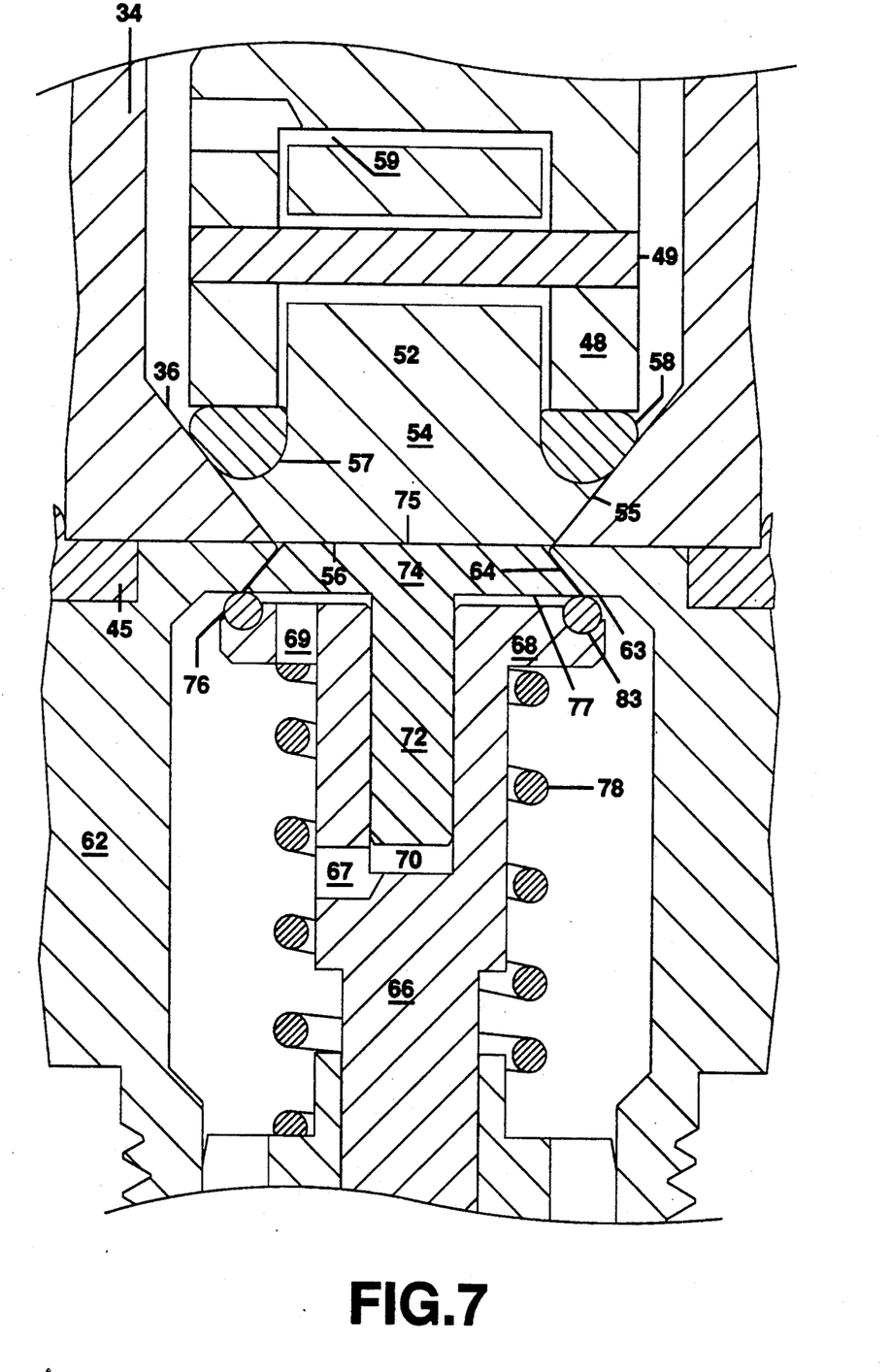
FIG. 7 is an enlarged view of FIG. 6.

When flow stops the compressible seal 76 acts as a spring and opens the gap between valve stem head 68 and the conical head 74 of poppet 72. Simultaneously spring 78 actuates the second valve stem 66 to thrust valve stem 66 toward poppet 52. FIGS. 6 and 7 show poppet 72 of the second valve 60 after valve seat 64 has been evacuated and valve 60 has been closed (but prior to sealing) by the thrust of valve stem 66 against compressible seal 76. The poppet 72, moving independently, comes to rest in the valve seat 64 of the second valve housing 62. Again, because the surfaces of valve seat 64 and conical head 74 are precision machined the conical head 74 fits flushly against the valve seat 64 and the leading ends 56 and 75 respectively of the poppets 52 and 72 abut flushly against each other prior to the compression of the second compressible valve seal or O-ring 76, thereby allowing the evacuation of any fluids from the conical valve seat area.

Figure 8:
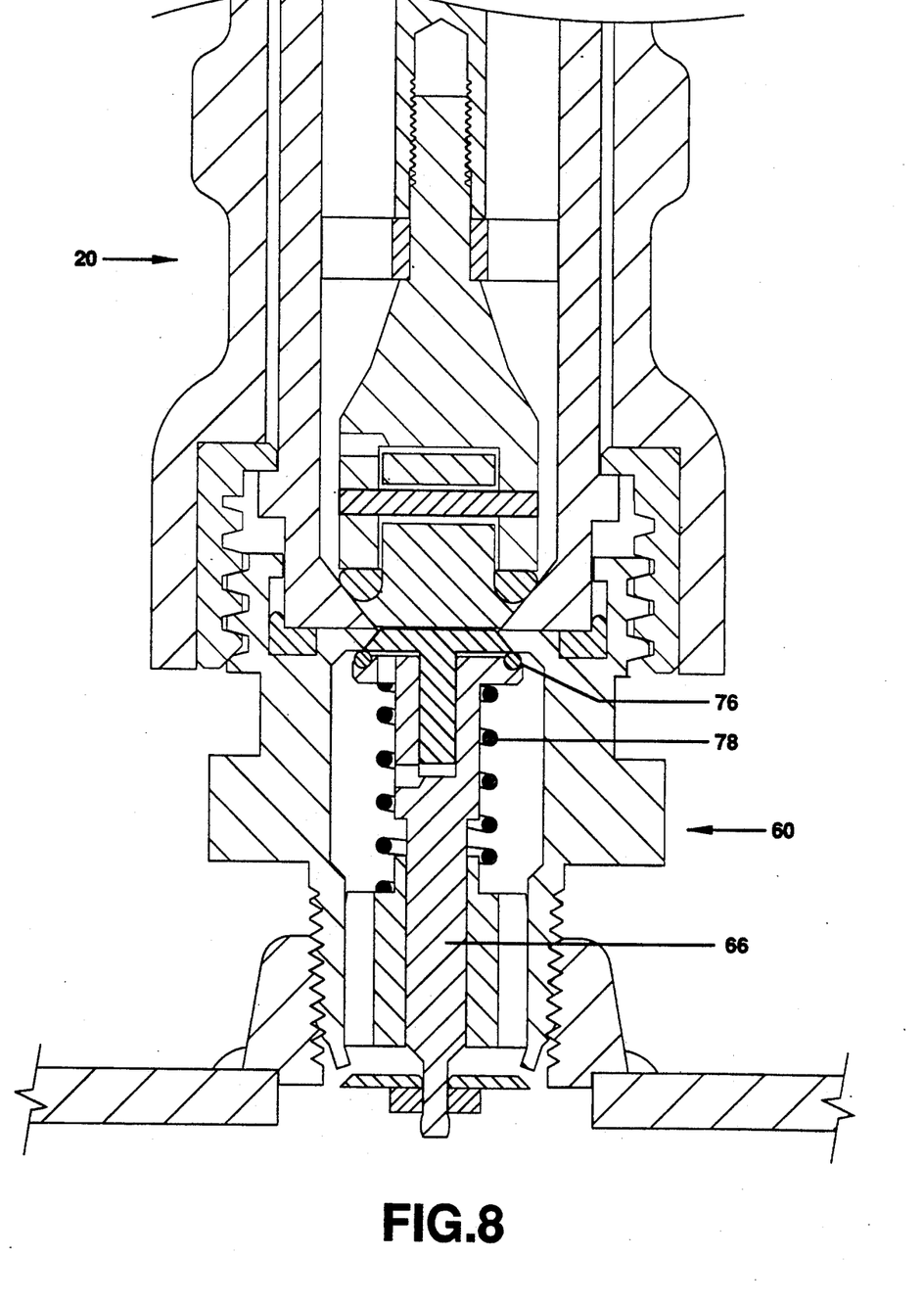
FIG. 8 represents phase 5 of the method of the invention and shows the valve system in the closed position.
Figure 9:
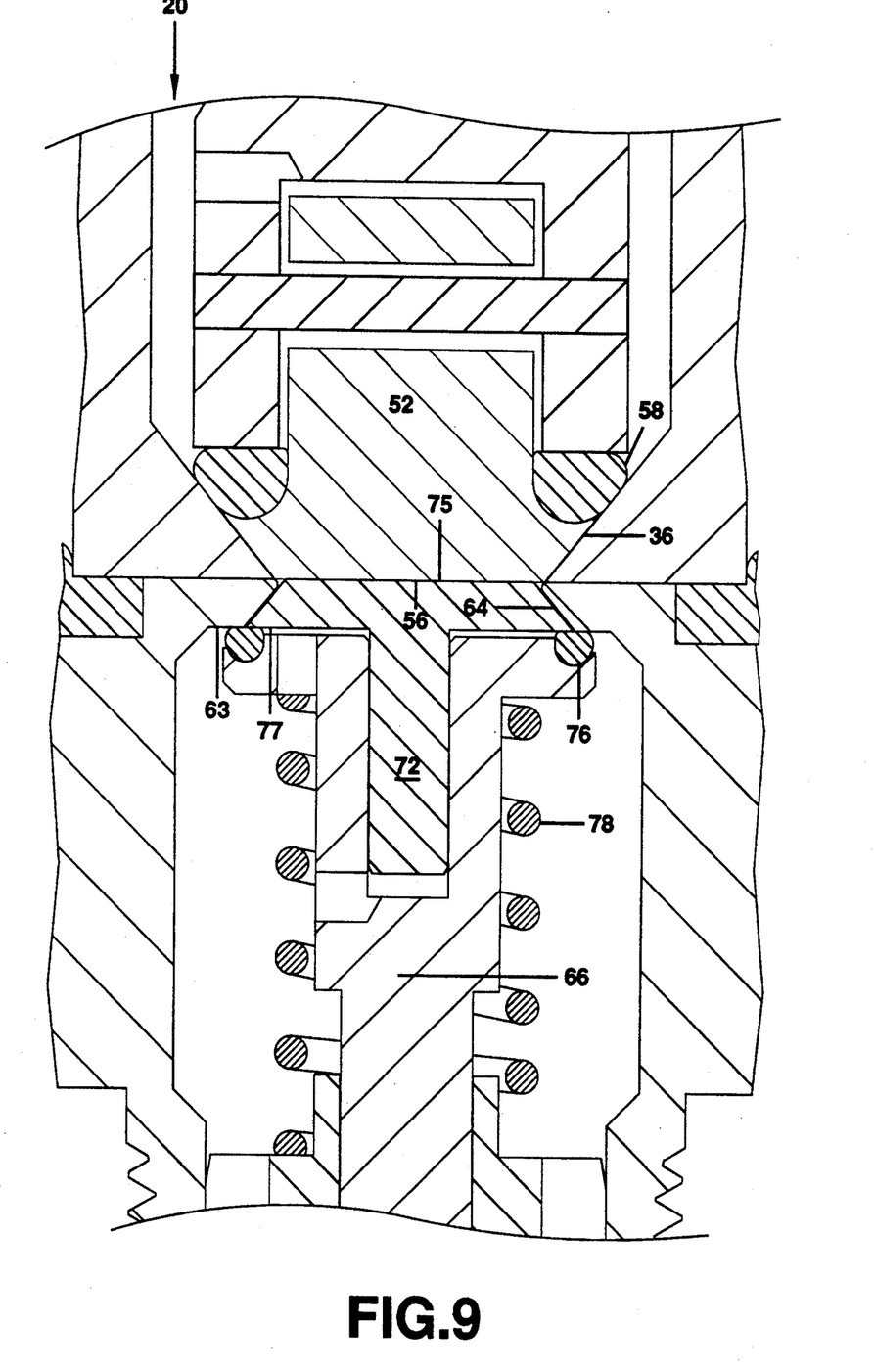
FIG. 9 is an enlarged view of FIG. 8.
Figure 10:
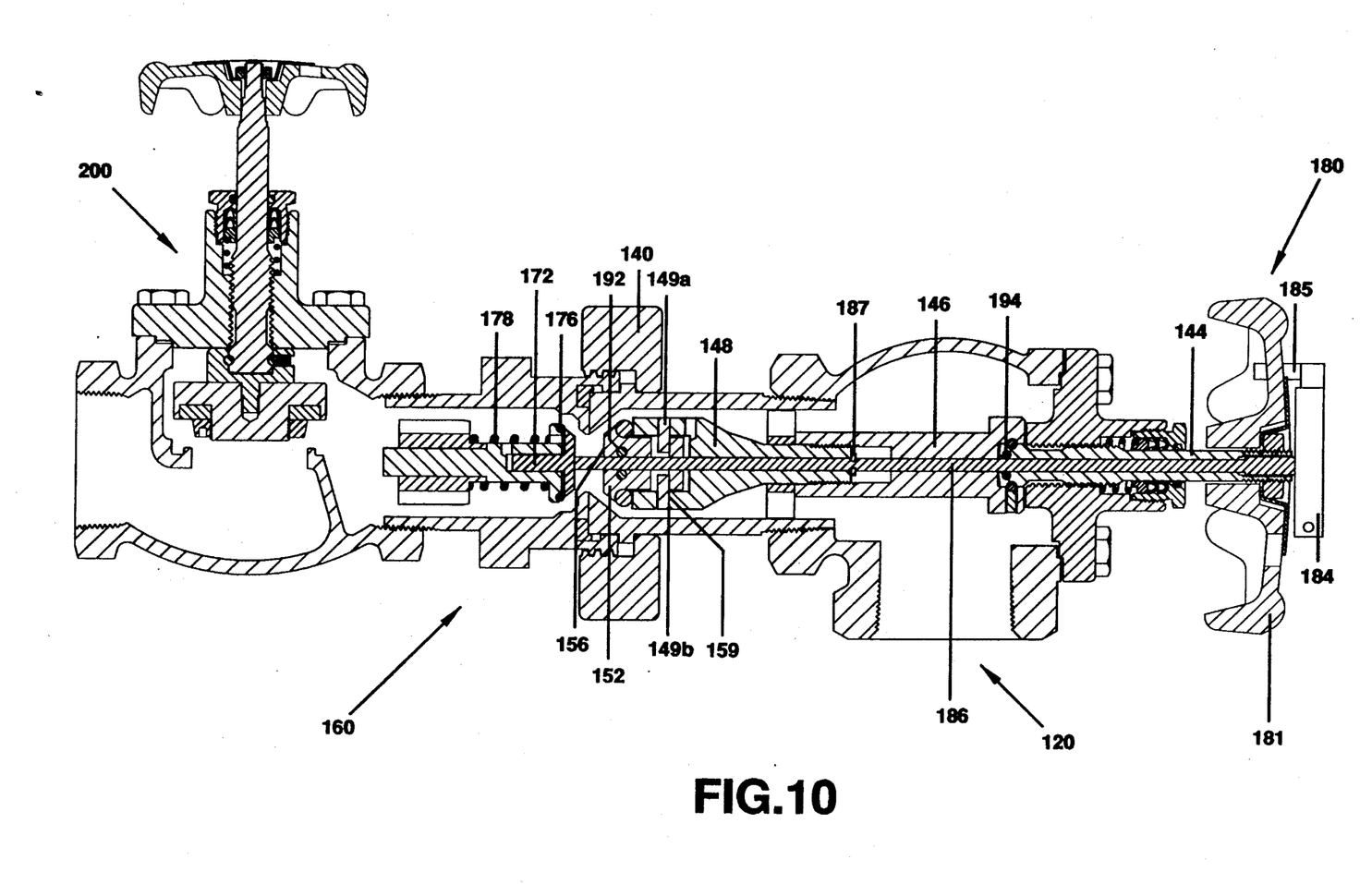
FIG. 10 is another embodiment of the invention utilizing a hand operated valve, vapor return system showing the valve system in phase 1 or the open position.

FIGS. 8 and 9 show the completed seal which occurs after valve 60 is in the closed position. The valve stem 66 of the second valve 60 compresses the second compressible seal or O-ring 76 thereby completing the seal. Springs 27 and 78 maintain a continuous thrust on the poppets to maintain the valves in a closed and sealed position (with a hand operated valve as shown in FIG. 10 the first valve will be mechanically held in the closed position). At this point all fluids have been essentially eliminated and the valves 20, 60 can be disengaged without unwanted emissions to the atmosphere.

During disconnection of the valves emissions are reduced to a point where they are essentially eliminated. Since the poppet and valve seat surfaces are conical and machined to a point where they are metal to metal; since the leading end of the poppets are machined to sit in the same plane as the planar surfaces of the valve housings which are flushly abutting; and since edges are precisionally machined, emissions are limited to fluid or vapor trapped and released from cavities where edges do not meet flushly or are chamfered. Any fluid or vapor contained in cavities attributable to chamfered edges would be released to the atmosphere when the valves are disconnected. Therefore the only limitation on the amount of emission reduced by the present invention is attributable to the machining of edges by one skilled in the art. Perfect edges cannot be machined due to the brittleness of materials or since perfectly sharp edges would easily nick.

FIGS. 10-14 represent another embodiment of the invention for use in a vapor return system. The embodiment shown in FIGS. 1-9 is designed as a filler valve system for the introduction of liquids to a tank 15. The back check valve 60 will not open to allow vapor return. However vapor return can be accomplished with such a back check valve through the implementation of a means for opening the back check valve. Such an embodiment as shown in FIGS. 10-14 is normally combined with the embodiment shown in FIGS. 1-9 to form a ZERO BLEED system including a ZERO BLEED filler connection and a ZERO BLEED vapor return connection. It is to be understood that the filler connection is much more important to accomplishing the result of essentially eliminating the leaking of vapors to the atmosphere. This is because liquid may expand, for example, around 700 times when it leaks to the atmosphere whereas any vapors trapped in the vapor return connection may be trapped at, for example, 150-200 psi and therefore any expansion is comparatively nominal when vapor is leaked to the atmosphere. In the vapor return embodiment of FIGS. 10-14 the parts and construction are similar to the embodiment shown in FIGS. 1-9 except as discussed below.

Actuator 180 (as shown actuator 180 is preferably a hand activated rather than a spring activated globe valve), actuator stem 144, valve stem 146 and valve stem head 148 form an outer stem defining a central bore. Poppet 152 also contains a central bore and a hole 159 perpendicular to the central bore. Two roll pins 149a and 149b are mounted in poppet 152 through hole 159. Poppet 152 has an O-ring groove containing an O-ring 192.

A second actuator 184 is connected to a second or inner stem 186. Second stem 186 is contained within the central bore. A snap ring 187 is attached around inner stem 186. The second actuator 184 screws to move the inner stem 186 relative to the outer stem. Snap ring 187 controls or limits the movement of inner stem 186. When snap ring 187 abuts valve stem 146 the end 188 of inner stem 186 is retracted from the leading end 156 of poppet 152 unless the valve is closed and O-ring 158 is squeezed at which time end 188 of inner stem 186 is flush with the leading end 156 of poppet 152. When snap ring 187 abuts valve stem head 148 the protrusion of end 188 of inner stem 186 is sufficient to open valve 160 when valve 120 is open.

In FIG. 10 the first valve 120 and the second valve 160 are shown in the phase 1 or open position. A bobtail valve 200 can be used as a vapor shut off valve. The construction and use of such a valve is known to one of ordinary skill in the art. In this embodiment a hammer union 140 is shown in place of a speed nut although the function and use are similar. The first or hose end valve 120 allows vapor return to a bulk storage tank (not shown). The inner stem 186 is shown holding the second valve 160 in the open position and O-ring 176 is precompressed. Vapor is allowed to return through the valve system to the bulk storage tank.

Figure 11:
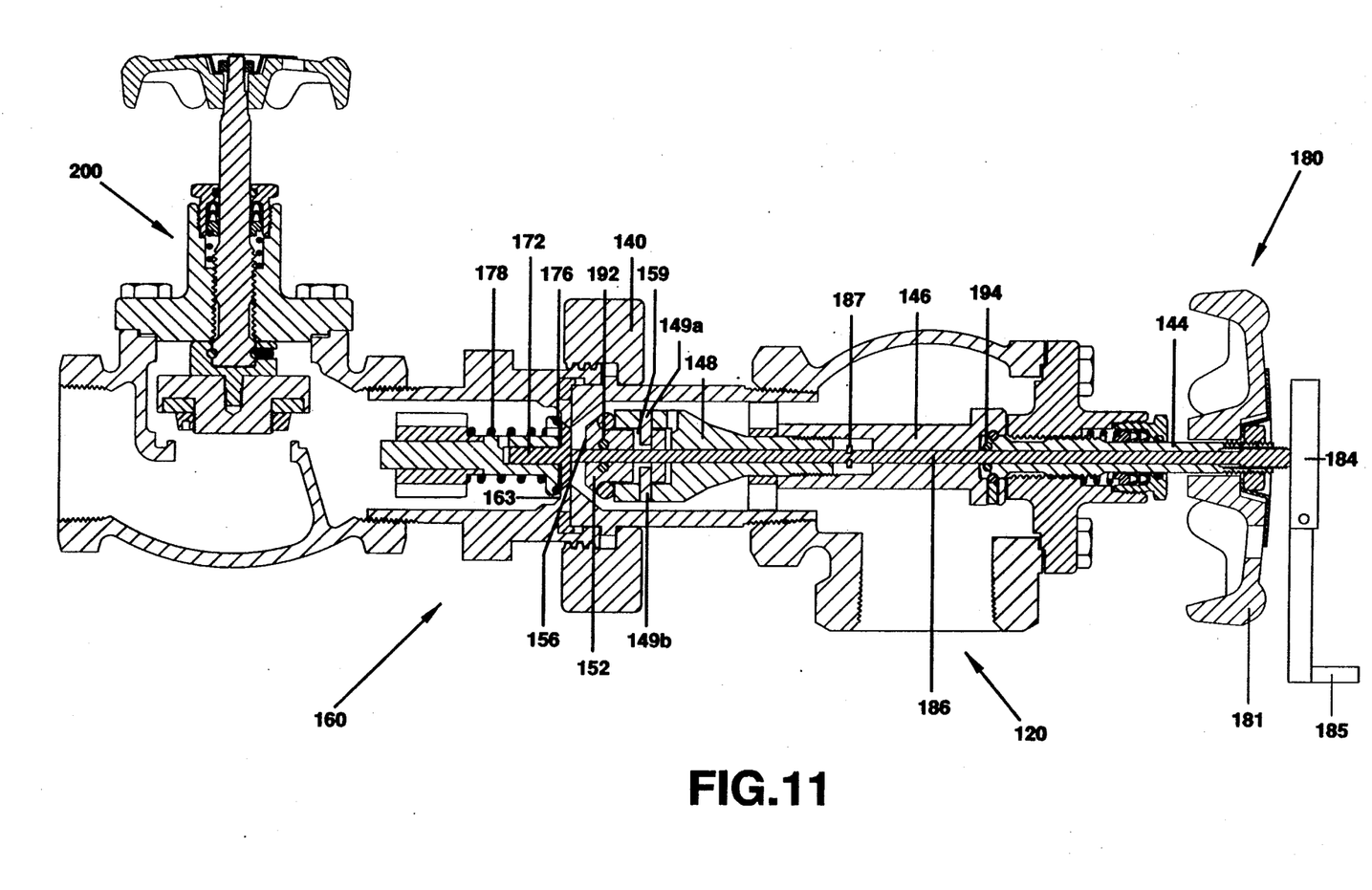
FIG. 11 is a diagram showing phase 2 of the vapor return system.

FIG. 11 represents phase 2 of the vapor return system. Handle 185 of second actuator 184 has been rotated to back off inner stem 186. Handle 185 is left open. Since O-ring 176 is precompressed the O-ring will contact valve surface 163 prior to closing of the valve 160. However, spring 178 will continue to force poppet 172 to evacuate the valve out the leading end until valve 160 is closed and sealed. Phase 3 of the vapor return system is not shown in the drawings. However phase 3 is substantially represented by referring to the first valve 20 in FIG. 4.

Figure 12:
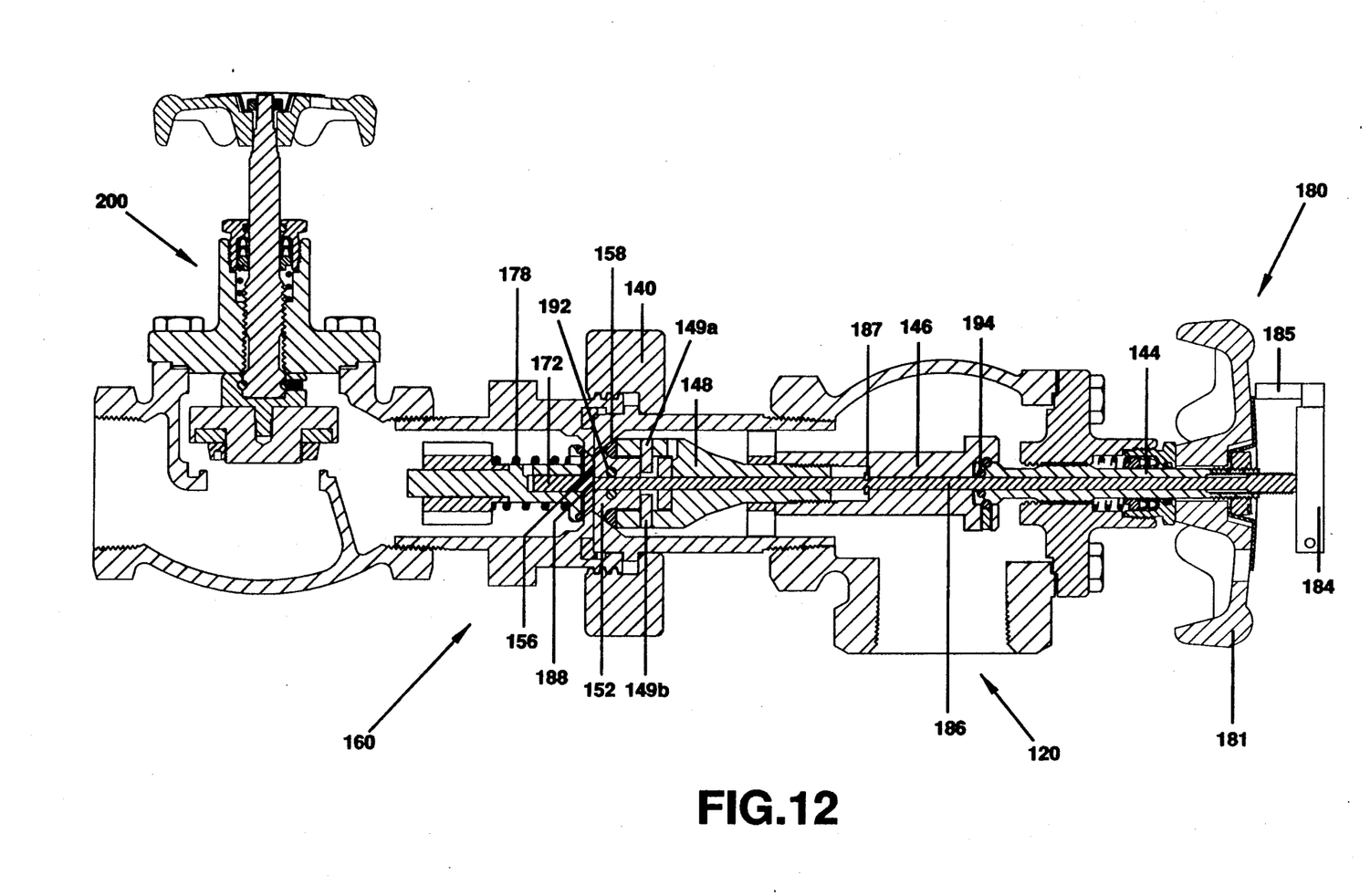
FIG. 12 is a diagram showing phase 4 or the closed and sealed position of the vapor return system.

Phase 4 of the vapor return system is shown in FIG. 12. Handle 181 has been turned to squeeze O-ring 158 and thereby seal the first valve 120. The system is now completely closed and sealed. The end 188 of inner stem 186 must be a flat surface. When fully retracted the end 188 will be flush with the leading end 156 of poppet 152 when valve 120 is closed. The diameter of the inner stem 186 and the diameter of the central bore are precisionally machined to substantially eliminate any gaps or cavities between these pieces which could collect liquids or vapors.

Figure 13:
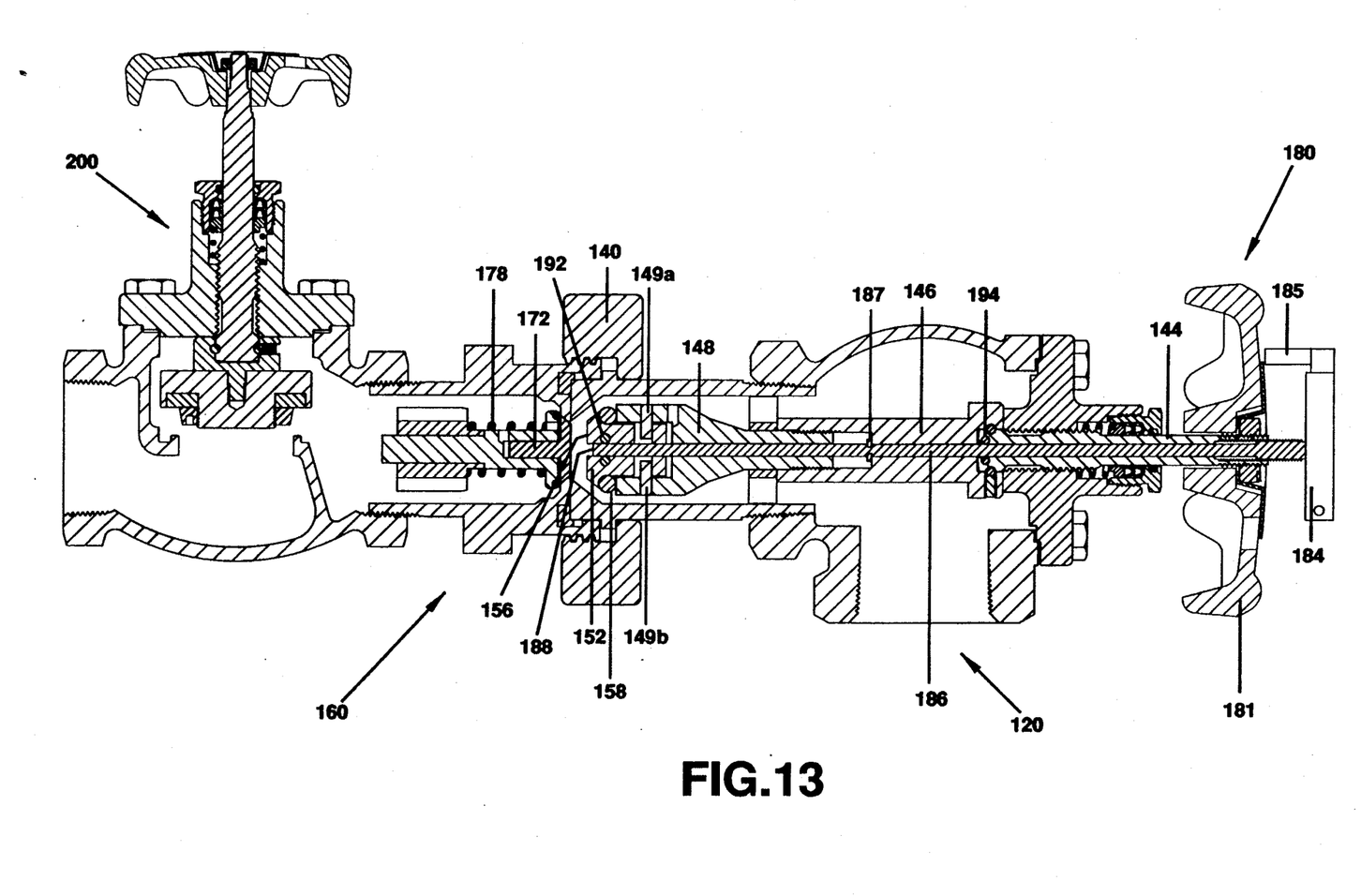
FIG. 13 is a diagram showing phase 5 of the vapor return system.
Figure 14:
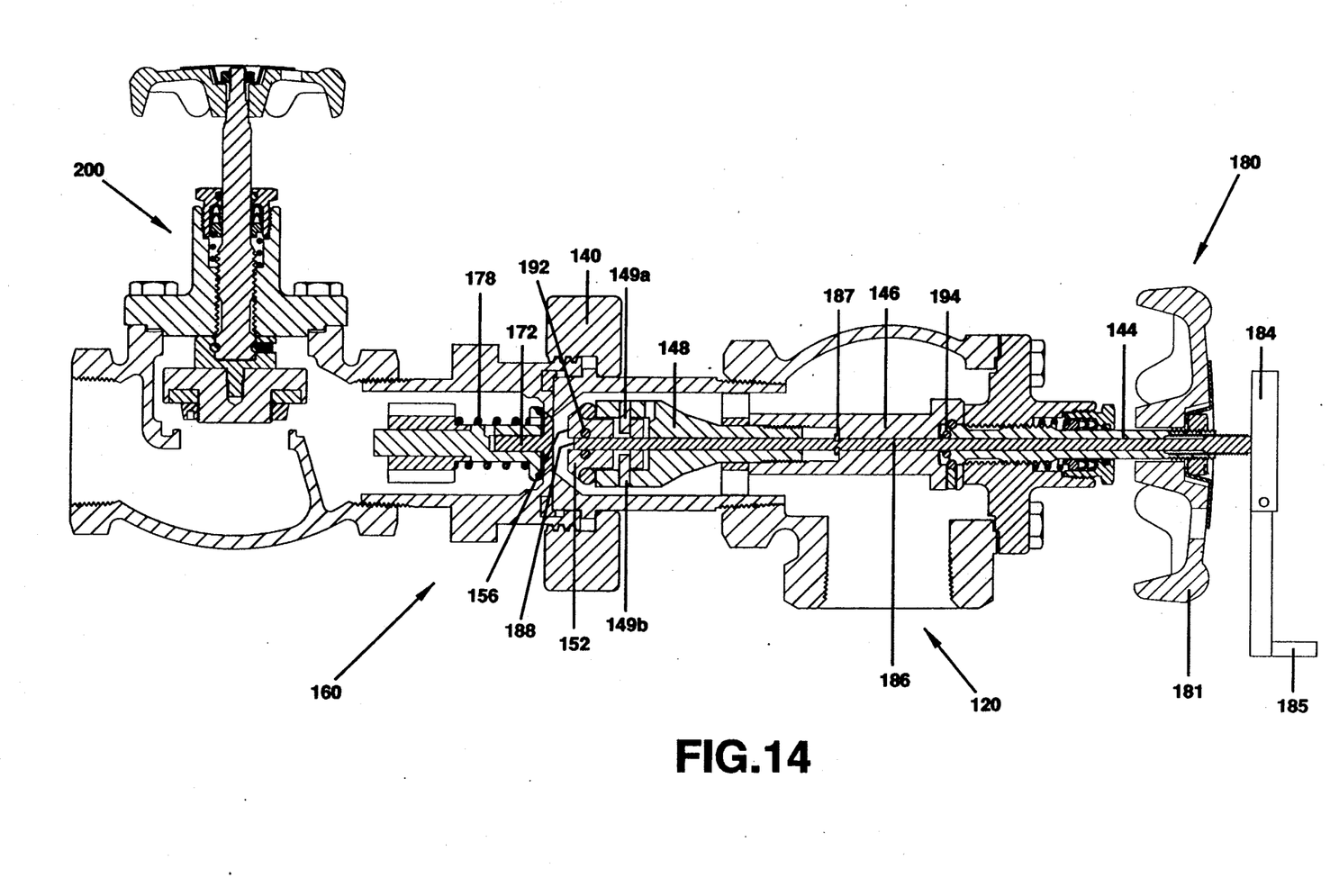
FIG. 14 is a diagram showing phase 5 of the vapor return system with the handle flipped open.

Referring to FIG. 13 when vapor return is desired the bobtail valve 200 is opened. In phase 5 the first valve 120 is opened by turning handle 181. O-ring 158 will extend poppet 152 beyond the end 188 of inner stem 186. Referring to FIG. 14 the handle 185 on the second actuator 184 should be flipped open to allow manipulation of the inner stem 186. The operator will then rotate handle 185 until the inner stem 186 thrusts the second poppet 172 against the force of the spring 178 to open the second valve 160 as shown in FIG. 10 (or phase 1).

The method described above is the preferred method for closing the vapor return system due to pre-compression of O-ring 176. As described above, in this method the inner stem 186 is first backed off causing valve 160 to evacuate, close and seal. Once the "play" on handle 185 is "loose," the operator will know that the valve 160 is closed and sealed. The handle 185 on the inner stem 186 is left open. The first valve 120 is then closed and sealed by actuator 180. Hammer union 140 is then disconnected. There are two other methods for closing and sealing the system. The second valve 160 could be closed by continuing to retract the inner stem 186 after the "play" of handle 185 is "loose" until snap ring 187 stops the retraction. Handle 185 can then be closed and handle 181 rotated to evacuate, close and seal the first valve 120. With this method there is a cavity formed between end 188 of the inner stem 186 and the leading end 175 of poppet 172 which is essentially compressed to zero as the O-ring 158 is compressed. The vapor return system could also be shut off by closing first valve 120 prior to backing off inner stem 186 if second valve 160 is designed to accomodate the increased throw placed upon poppet 172. After the first valve 120 is evacuated, closed and sealed, the inner stem 186 could then be backed off for evacuating, closing and sealing the second valve 160. However due to precompression of O-ring 176, vapors may be trapped between the leading end 175 of poppet 172, and valve seat 164 and the leading end 156 of poppet 152.

The valve system shown in FIGS. 10-14 essentially eliminates the escape of liquids and vapors to the atmosphere upon disconnection of the valve housing since the interaction of the poppets, valve seats and the compression of the valve seals are essentially the same as described above for FIGS. 1-9.

The foregoing disclosure and description of the invention are illustrative and explanatory thereof and various changes in the size, shape, combination of materials, the details of the illustrated construction as well as the methods may be made without departing from the scope of the invention. It is understood that the invention is not limited to the specific embodiments or methods disclosed above for the purpose of exemplification, that many modifications and changes will be apparent from the description and drawings without departing from the scope of the attached claims.

We claim:

1. A valve system for essentially eliminating emissions upon closing of the valve, comprising:
   a first valve;
   a second valve opposing said first valve, said first and second valves forming a continuous fluid passageway along the axis of said valves when the valve system is in an open position;
   said first valve including a first housing and a first valve stem assembly ending in a valve head having a recessed bore;
   a first poppet slip fitted within the recessed bore of said first valve stem;
   a second valve including a second valve stem assembly ending in a second valve head having a recessed bore;
   a second poppet slip fitted within the recessed bore of said second valve stem;
   a first compressible seal positioned between said first poppet and said first valve stem head in a position preventing contact of said first compressible valve seal with a first valve seat prior to said first poppet seating flushly in said valve seat and allowing said first compressible seal to be squeezed by said first valve stem head after said first poppet seats flushly; and
   a second compressible seal positioned between said second poppet and said second valve stem head in a position preventing contact of said second compressible seal with a second valve seat prior to said second poppet seating flushly in said second valve seat and allowing said second compressible seal to be squeezed by said second valve stem head after said second poppet seats flushly.

2. The valve system according to claim 1, wherein said first poppet has a head with a conical surface having a correspondingly equal diameter to a conical surface on said first valve seat such that said head will seat flushly in said first valve seat from a leading end of said head which is flush with an end of said first valve seat and an end of said housing.

3. The valve system according to claim 2, wherein said second valve seat and a head of said second poppet have equal thickness such that a trailing end of said head and a back side of said second valve seat are flush when said second poppet is seated in said second valve seat.

4. The valve system according to claim 1, further including an inner stem contained within a bore defined by said first valve stem assembly and said first poppet, said inner stem being independently actuatable relative to said first valve stem for thrusting said inner stem against a leading end of said second poppet.

5. The valve system according to claim 1, wherein said first compressible seal has an outer diameter less than an inner diameter of said first valve seat at a height of said first valve seat where said first compressible seal is positioned when said first poppet seats flushly in said first valve seat.

6. The valve system according to claim 1, wherein said second valve seat and a head of said second poppet have equal thicknesses and said second compressible seal is seated adjacent said second poppet head abutting an imaginary line defining the interface between said second poppet head and said second valve seat.

7. The valve system according to claim 1, wherein said first compressible seal has an outer diameter which is not greater than the outer diameter of an imaginary cone defined by said first poppet at a height of the cone where said first compressible seal is positioned.

8. A valve system for essentially eliminating emissions upon closing of the valve, comprising:
   a first valve;
   a second valve opposing said first valve, said first and second valves forming a continuous fluid passageway along the axis of said valves when the valve system is in an open position;
   said first valve including a first housing defining a first valve seat, and a first valve stem assembly ending in a first valve stem head having a recessed bore;
   a first poppet slip fitted within the recessed bore of said first valve stem;
   a first compressible seal positioned between said first poppet and said first valve stem head;
   said first poppet having a head with a conical surface having a correspondingly equal diameter to a conical surface on said first valve seat such that said first poppet head will seat flushly in said first valve seat from a leading end of said first poppet head which is flush with an end of said first valve seat and an end of said first housing;
   said first compressible seal having an outer diameter less than an inner diameter of said first valve seat at a height of said first valve seat where said first compressible seal is positioned when said first poppet seats flushly in said first valve seat;
   said second valve including a second housing defining a second valve seat, and a second valve stem assembly ending in a second valve stem head having a recessed bore;
   a second poppet slip fitted within the recessed bore of said second valve stem;
   a second compressible seal positioned between said second poppet and said second valve stem head abutting an imaginary line defining the interface between a second poppet head and said second valve seat;
   said second poppet head having a conical surface having a correspondingly equal diameter to a conical surface on said second valve seat such that said second poppet head will seat flushly in said second valve seat from a leading end of said second poppet head which is flush with an end of said second valve seat and an end of said second housing; and
   said second valve seat and said second poppet head having equal thicknesses such that a trailing end of said second poppet head and a back side of said second valve seat are flush when said second poppet is seated in said second valve seat.

9. The valve system according to claim 8, further including an inner stem contained within a bore defined by said first valve stem assembly and said first poppet, said inner stem being independently actuatable relative to said first valve stem for thrusting said inner stem against a leading end of said second poppet.

10. A method for closing and sealing a valve which reduces unwanted emissions, comprising:

opening a first valve within a first valve housing having a first valve seat;

thrusting a second valve stem within a second valve housing having a second valve seat;

thrusting a compressible seal by means of said step of thrusting the second valve stem;

thrusting a poppet by means of said step of thrusting the compressible seal until the poppet completely evacuates a fluid from the second valve seat and comes to rest within the second valve seat; and thrusting the second valve stem against the compressible seal until the second valve is sealed.

* * * * *